HAROLD LERMAN
MURRAY S. GOLDSTEIN
INVENTORS

BY S. A. Giarratana
Francis L. Masselle
ATTORNEYS

Nov. 25, 1969  H. LERMAN ET AL  3,480,766
INERTIAL-NAVIGATOR USING ANALOG INTEGRATORS
WITH DIGITAL LOGIC
Filed Sept. 30, 1963  6 Sheets-Sheet 6

MURRAY S. GOLDSTEIN
HAROLD LERMAN
INVENTORS

BY Karl A. Ohralik

ATTORNEYS 3,480,766
INERTIAL NAVIGATOR USING ANALOG INTE-
GRATORS WITH DIGITAL LOGIC
Harold Lerman, Paramus, N.J., and Murray S. Goldstein,
Spring Valley, N.Y., assignors to Singer-General Pre-
cision Systems Inc., a corporation of Delaware
Filed Sept. 30, 1963, Ser. No. 312,684
Int. Cl. G06f 15/50; G06g 7/70, 7/78
U.S. Cl. 235—150.25                                7 Claims

ABSTRACT OF THE DISCLOSURE

Inertial navigation system using first and second digital reset integrators. The first integrators are used to derive velocity from acceleration and the second integrators are used to derive position from velocity. In order to make use of digital reset integrators in an analog inertial navigation system, stepper motors which rotate incrementally in response to the output pulses are used in conjunction with potentiometers to convert the pulse output from the reset integrators to analog signals. Because conventional stepper motors are limited in the number of pulses per second that they can receive, a dual speed reset integrator is employed.

---

This invention relates to inertial navigation and more particularly to an analog inertial navigation system in which the integration is performed by digital reset integrators. The invention also relates to a dual speed digital reset integrator used in the inertial navigation system.

A primary requirement of a highly accurate inertial navigation system is having highly accurate first and second integrators. The first integrators are used to derive velocity from acceleration and the second integrators are used to derive position from velocity. The inertial navigation system of the present invention has a greatly improved accuracy because it uses digital reset integrators, which are extremely accurate, for the first and second integrators.

A digital reset integrator comprises an analog integrator, the output voltage of which is fed to a pair of triggers. One of the triggers, referred to as a positive voltage trigger, will cause a negative reset pulse with a precise impulse content to be applied to the input of the analog integrator when a positive output signal voltage of the analog integrator reaches the trigger value of the positive voltage trigger. The negative reset pulse will cause the output signal voltage of the analog integrator to change in the negative direction by an amount substantially equal to the trigger value. The other trigger, referred to as the negative voltage trigger, will cause a positive reset pulse with a precise impulse content to be applied to the input of the analog integrator when a negative output signal voltage of the analog integrator reaches the trigger value of the negative voltage trigger. The trigger value for the negative voltage trigger and the impulse content of the positive reset pulses have the same magnitudes as the trigger value for the positive voltage trigger and the impulse content of the negative reset pulses. Accordingly a positive reset pulse will cause the output voltage of the analog integrator to change in the positive direction by an amount equal to the trigger value for the negative voltage trigger. The reset integrator produces an output pulse on one channel each time it produces a negative reset pulse and produces an output pulse on a second channel each time it produces a positive reset pulse. When a signal to be integrated is applied to the input of the analog integrator the number of pulses produced on the first channel minus the number of pulses produced on the second channel will represent the integral of the applied signal.

In order to make use of digital reset integrators in an analog inertial navigation system, means are required to make use of the digital output of the reset integrators in an analog manner in the navigation system computer. In accordance with the present invention stepper motors which rotate incrementally in response to the output pulses are used in conjunction with potentiometers to convert the pulse output from the reset integrators to analog signals. However, conventional stepper motors are limited in the number of pulses per second that they can receive. Because of this limitation and because the acceleration signals will be relatively large the reset pulses in the reset integrator used for first integrators must each effect a relatively large voltage change. However, the amount by which the reset pulses change the output voltages of the analog integrators is inversely proportional to the resolution of the output from the reset integrators. Therefore, in the system of the present invention, in order to obtain the desired resolution, a dual speed reset integrator was designed to perform the function of the first integrators. This dual speed reset integrator makes use of two types of reset pulses, one resetting the output voltage of the analog integrator by a small amount and the other resetting the output voltage of the analog integrator by a large amount. In the specific embodiment of the present invention the latter type reset pulses cause voltage changes ten times that caused by the former type. The former type of reset pulse provides the desired resolution and the latter type of reset pulse provides the desired response to the large acceleration input signals.

The dual speed reset integrator comprises a first pair of triggers controlling the application of the former type of reset pulses and having trigger values corresponding to the former type of reset pulses and a second pair of triggers controlling the application of the latter type of reset pulses and having trigger values corresponding to the latter type of reset pulses. Both types of reset pulses have the same impulse content and are actually identical in the dual speed reset integrator of the present invention. The different effect in the resetting of the analog integrator output is achieved by means of a summing circuit, which combines the reset pulses of the first type and the second type and applies them to the input of the analog integrator. This summing circuit achieves the desired different resetting effects by attenuating the rest pulses of the former type ten times as much as the reset pulses of the latter type are attenuated.

Accordingly, a principal object of the present invention is to provide an improved inertial navigation system.

Another object of the present invention is to provide a more accurate inertial navigation system.

A further object of the present invention is to increase the accuracy of inertial navigation systems.

A still further object of the present invention is to provide improved integration in inertial navigation systems.

A still further object of the present invention is to provide more accurate integration in inertial navigation systems.

A still further object of the present invention is to provide an inertial navigation system in which the integration is performed by reset integrators.

Further objects and advantages of the present invention will become readily apparent as the following detailed description of the invention unfolds, and when taken in conjunction with the drawings, wherein.

The present invention makes use of digital reset integrators of the type disclosed in a copending application Ser. No. 279,422 entitled Digital Reset Integrator, invented by Allan Gerard, Harold Lerman and Murray Goldstein and filed on May 10, 1963, now Patent No. 3,322,942, granted May 30, 1967.

Figure 1:
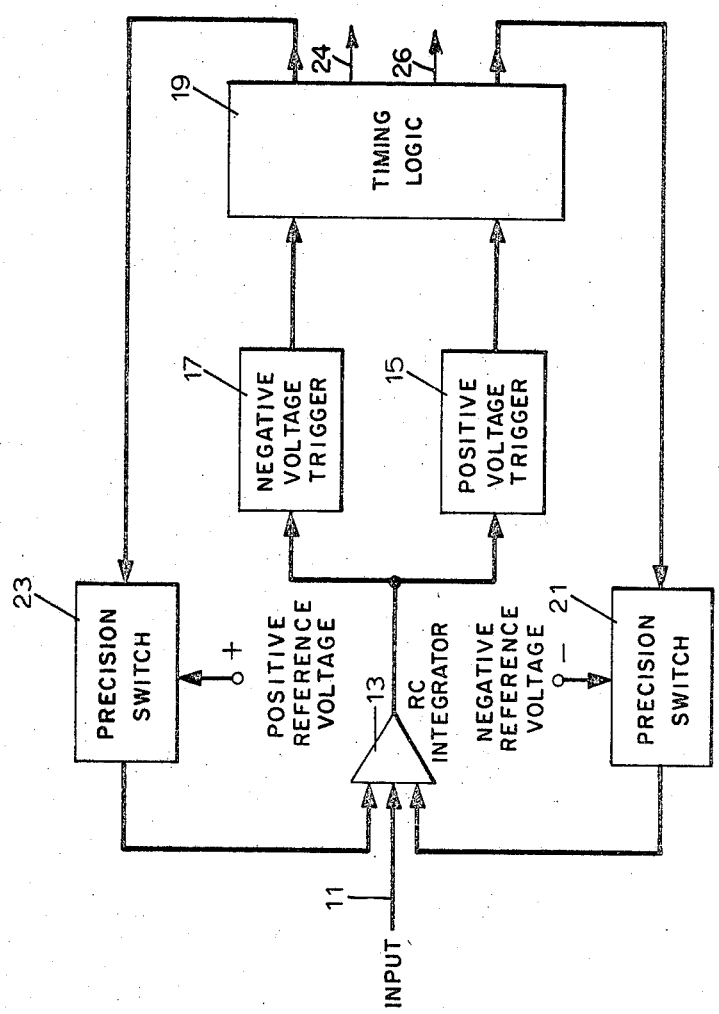
FIG. 1 illustrates a reset integrator used in the inertial navigation system of the present invention.

As disclosed in this copending application and as shown in FIG. 1 in the digital reset integrator, the analog signal to be integrated is applied at an input 11. From the input 11 the signal is applied to the input of an RC analog integrator 13, which, except for having a high scale factor, is a conventional RC analog integrator. The output signal voltage from the RC analog integrator 13 is applied to a positive voltage trigger 15 and to a negative voltage trigger 17. The triggers 15 and 17 are set to detect when the output signal voltage of the integrator 13 reaches a predetermined magnitude. This magnitude of voltage is referred to as the trigger magnitude. The positive voltage trigger 15 detects when a positive output signal voltage of the integrator 13 reaches the trigger magnitude. Upon detecting this event the positive voltage trigger 15 applies an enabling signal to timing logic 19 shown in detail in FIG. 4 of the drawings. The negative voltage trigger 17 detects when a negative output signal voltage of the integrator 13 reaches the trigger magnitude and in response thereto applies an enabling signal to the timing logic 19. The timing logic 19, responsive to receiving an enabling signal from the positive voltage trigger 15, closes a precision switch 21 for a precise time interval. When the precision switch 21 is closed, it applies a precisely selected negative reference voltage to the input of the integrator 13. Thus a negative pulse having a precise amplitude and a precise length is applied to the input of the integrator 13 in response to the output signal voltage of the integrator 13 being positive and reaching the trigger magnitude. The integrator 13 will integrate the applied negative pulse and reflect this integration in its output signal voltage. The length of time that the precision switch 21 is closed and the magnitude of the negative reference voltage that is applied to the integrator 13 when the precision switch 21 is closed are selected so that the impulse content of the negative pulse applied to the integrator 13 is such to drive the output signal voltage of the integrator 13 back substantially to zero. The timing circuit 19, in response to an enabling signal from the negative voltage trigger 17, will close a precision switch 23 for the same precise time interval that it closes the precision switch 21 in response to the enabling signal from the positive voltage trigger 15. When the precision switch 23 is closed, it applies a positive reference voltage to the integrator 13 so that a positive pulse is applied to the integrator 13 in response to a negative output voltage of the integrator 13 reaching the trigger magnitude. The positive reference voltage applied through the switch 23 to the integrator 13 has the same magnitude as the negative reference voltage applied to the integrator 13 through the switch 21. Thus when the output signal voltage of the integrator 13 is negative and reaches the trigger magnitude, a positive pulse will be applied to the integrator 13 and this positive pulse, upon being integrated by the integrator 13, will drive the output signal voltage of the integrator 13 substantially back to zero. It is not essential that the pulse applied to the integrator 13 by the precision switches 21 and 23 drive the output signal voltage of the integrator 13 precisely back to zero, but it is essential that they both have a precisely predetermined impulse content, as a variation in the impulse content of these pulses will cause a scale factor error in the output from the integrator. Each time the timing logic 19 closes the precision switch 21 it produces a pulse on an output channel 24 and each time the timing logic 19 closes the precision switch 23 it produces a pulse on an output channel 26. The number of pulses produced on output channel 24 minus the number of pulses produced on output channel 26 will represent the integral of the signal applied on input 11 and the pulses produced on outputs 24 and 26 will represent positive and negative increments of this integral, respectively.

The above described reset integrator is used in the inertial navigation system of the present invention to integrate accelerometer outputs to provide signals representing velocity and to integrate velocity representing signals to provide signals representing position. To produce the velocity representing signals from the output of the integrators integrating the accelerometer output signals, the output pulses from the reset integrators are used to drive stepping motors. The stepping motors then position the movable contacts on the potentiometers to provide analog signals representing velocity.

The maximum velocity of an aircraft can range from 1,000 to 300 knots. It is desirable to know the value of this velocity to a resolution of abolt 0.1 knot. If, for example, the acceleration of the aircraft is on the order of 200 knots per second, then in order to get the desired resolution of 0.1 knot, the pulse rate would have to be acceleration of 200 knots per second divided by the resolution of 0.1 knot, or in other words, 2,000 pulses per second. However, there are no stepper motors presently available which can accept a rate as fast as 2,000 pulses per second. Because of this incapability of presently available stepping motors the reset integrator integrating the acceleration output is designed to be dual speed. By using a dual speed reset integrator the desired resolution of 0.1 knot is achieved with a stepper motor which is only capable of accepting 200 pulses per second.

Figure 4:
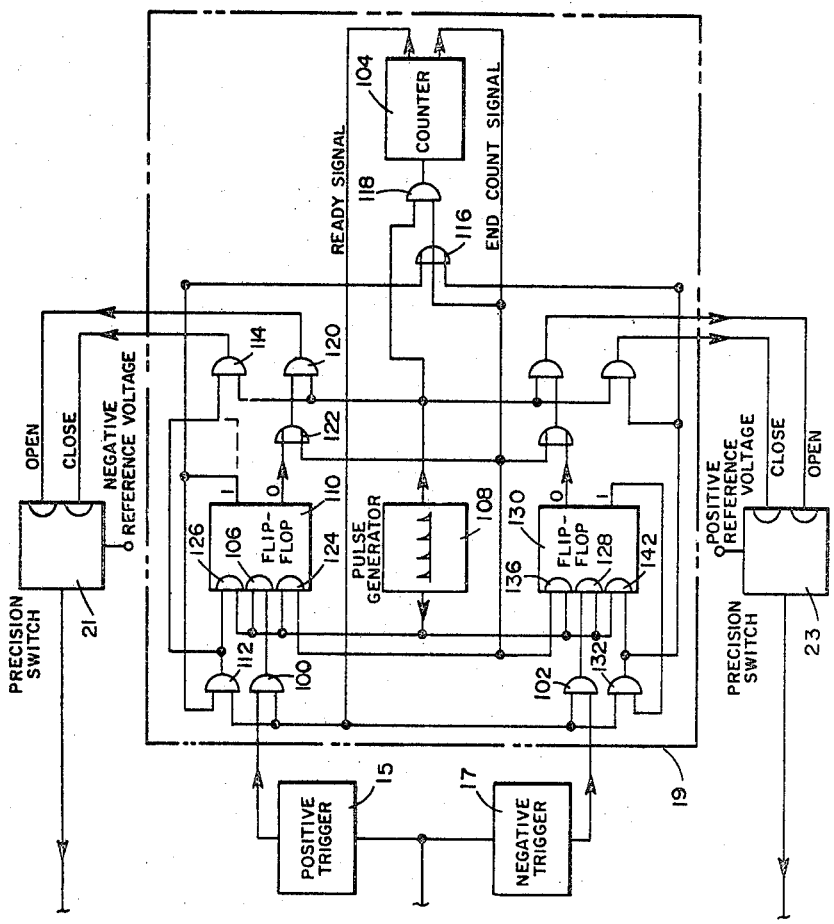
FIG. 4 illustrates the details of the timing logic component circuit forming a part of the reset integrators shown in FIGS. 1 and 2.
Figure 5:
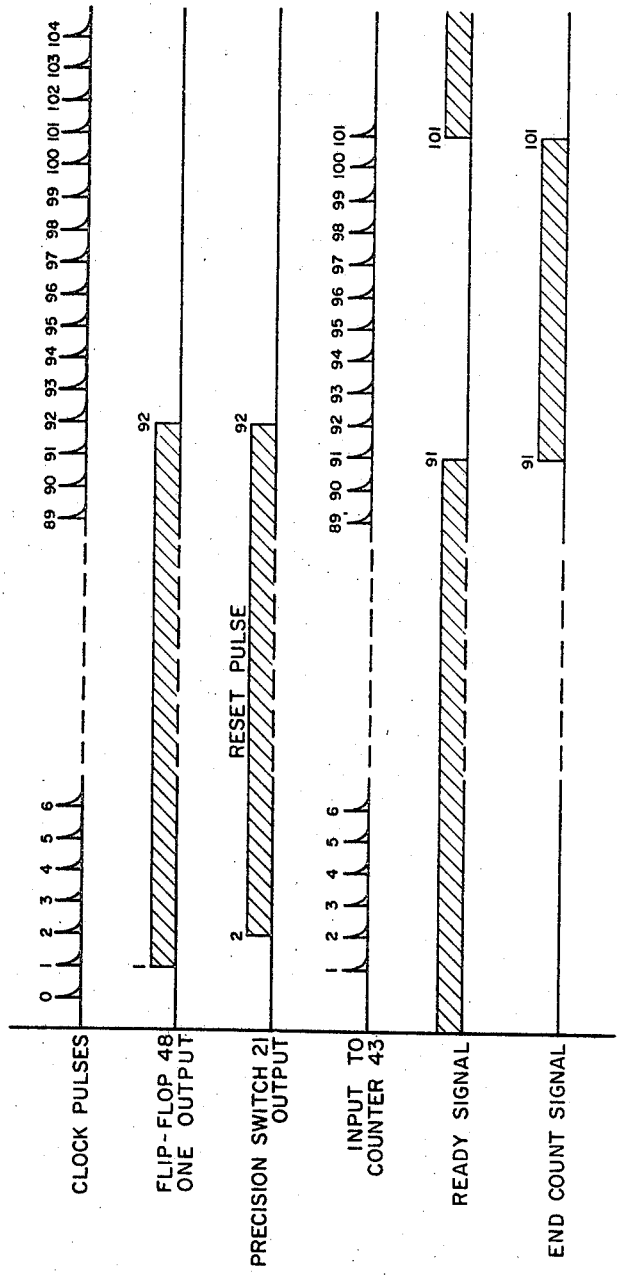
FIG. 5 is a timing chart illustrating the timing interrelationship of various components of FIG. 4.

The details of the timing logic circuit 19 together with the specific interrelationship and association with other components of the navigational system are shown in FIG. 4 of the drawings. As shown in this figure, the enabling signal produced by the positive trigger 15, in response to a positive output signal potential of the analog integrator 13 reaching the trigger magnitude, is applied to an AND gate 100 in the timing logic circuit 19. The enabling signal produced by the trigger 17 in response to a negative output signal potential from the integrator 13 reaching the trigger magnitude is applied to an AND gate 102 in the trigger logic 19. An enabling signal referred to as the ready signal is normally applied to the AND gates 100 and 102 from a counter 104 in the timing logic 19. When the AND gate 100 is receiving this ready signal from the counter 104, it will pass the enabling signal from the positive trigger 15 to an AND gate 106, enabling this AND gate 106. Pulses from a clock pulse generator 108 are also applied to the AND gate 106. After the AND gate 106 has been enabled by the enabling signal from the positive trigger 15 passing through the enabled AND gate 100, the next clock pulse from the clock pulse generator 108 will pass through the enabled AND gate 106 and set a flip-flop 110, which thereupon will produce a positive signal potential at its ONE output. The pulse from the clock pulse generator setting the flip-flop 110 is clock pulse No. 1 in FIG. 5. The positive signal potential from the ONE output of the flip-flop 110 is applied to an AND gate 112, which will also be enabled by the ready signal normally produced by the counter 104. The positive potential from the ONE output of the flip-flop 110 will therefore pass through the AND gate 112 and enable and AND gate 114, which also receives the pulses from the clock pulse generator 108. The AND gate 114, upon being enabled in this manner, passes the next pulse from the clock pulse generator 108, which pulse is clock pulse No. 2 in FIG. 5. This pulse is applied to the precision switch 21, which in response to this pulse closes and applies the negative reference potential to the input of the analog integrator 13. The positive potential from the ONE output of the flip-flop 110 passing through the enabled AND gate 112 also passes through an OR gate 116 and enables an AND gate 118, which also receives the pulses produced by the clock pulse generator 108. When the AND gate 118 is enabled, it will pass the pulses produced by the clock pulse generator 108 through to the binary counter 104, which counts the applied pulses. The first pulse applied to the AND gate 118 after it is enabled will be the next occurring clock pulse produced by the clock pulse generator 108 after the pulse passing through the enabled AND gate 106 and setting the flip-flop 110, or in other words clock pulse No. 2. Prior to the passing of the first pulse through the AND gate 118, the counter 104 will have a zero count registered therein. When the count registered by the counter 104 reaches 90, indicating that ninety pulses have passed through the AND gate 118, the counter 104 will stop generating the ready signal and hence the AND gates 100 and 112 will no longer be enabled. As a result the AND gate 114 will no longer be enabled by the output from the AND gate 112 and pulses from the clock pulse generator will stop passing through the AND gate 114 to the switch 21. When the counter 104 terminates the ready signal, it starts generating an end count signal, which is applied to an AND gate 120 through an OR gate 122. Since the counter 104 began counting with clock pulse No. 2, the counter 104 will reach a count of 90 at clock pulse No. 91 so the ready signal will be ended and an end count signal will be started at clock pulse No. 91 as shown in FIG. 5. The AND gate 120 which also receives pulses from the clock pulse generator 108, will be enabled upon receiving the end count signal and will pass the next pulse from the clock pulse generator to the precision switch 21, which in response to this pulse will open and disconnect the negative reference potential from the input of the integrator 13. The clock pulse which passes through the AND gate 120 and causes the precision switch to open will be clock pulse No. 92. Thus as shown in FIG. 5 the negative pulse applied to the input of the integrator by the precision switch 21 will start at clock pulse No. 2 and end at clock pulse No. 92, and thus will have a length of precisely 90 clock pulses. The end count signal from the counter 104 is also applied to an AND gate 124. The AND gate 124 also receives the pulses produced by the clock pulse generator 108, and upon being enabled by the end count signal from the counter 108 will pass the next pulse from the clock pulse generator to the flip-flop 110 to reset it This pulse will be clock pulse No. 92. The flip-flop 110 will then ceased to produce a positive enabling potential from its ONE output and will start producing an enabling signal potential from its ZERO output at clock pulse No. 92, as shown in FIG. 5. When the flip-flop 110 produces a positive signal potential from its ZERO output, this positive signal potential will pass through the OR gate 122 to enable the AND gate 120. When the counter 108 ceases to generate the ready signal, the AND gate 112 will no longer be enabled and apply an enabling signal to the AND gate 118. However, the AND gate 118 will remain enabled by the end count signal from the counter 104 passing through the OR gate 116. Thus the pulses from the clock pulse generator 108 will continue to pass through the AND gate 118 after the counter stops generating the ready signal. Clock pulse No. 92, which is the pulse that opens the switch 21, will therefore pass through the AND gate 118 and increase the count registered by the counter 104 to 91. The counter 104 will continue to count until the count registered therein reaches 99. The next pulse passing through the AND gate 118, which will be clock pulse No. 101, will reset the count registered by the counter 104 back to zero and the counter 104 will stop generating the end count signal and start again to generate the ready signal. Thus as shown in FIG. 5, the end count signal will be generated from clock pulse No. 91 to clock pulse No. 101 and the ready signal will be generated again starting at clock pulse No. 101. The AND gate 118 will thereupon no longer receive any enabling signal and the last pulse from the pulse generator 108 to pass through the AND gate 118 will be clock pulse No. 101, which sets the counter 104 back to zero. With this logic circuitry it will be noted that the precision switch 21, the flip-flop 110 and the counter 104 are operated solely by the precision pulses produced by the clock pulse generator 108. The clock pulses are made very precise in the preferred embodiment of the invention by using a crystal oscillator energizing a Schmitt trigger as the clock pulse generator 108. Because the precision switch 21, the flip-flop 110 and the counter 104 are all operated by the clock pulses, the operation of these units is more precise and reliable, and errors due to delay and instability in individual logic blocks do not accumulate. Because of this, the accuracy of the reset pulse generated by the precision switch 21 is very close to the accuracy of the clock pulse generator 108.

After the flip-flop 110 has been set, the positive potential from the ONE output of the flip-flop 110 passing through the enabled AND gate 112 will enable an AND gate 126 which also receives the clock pulses produced by the clock pulse generator 108. The pulses passing through the AND gate 126 are applied to that input of the flip-flop 110 by means of which the flip-flop is set. Thus, after the flip-flop 110 has been set by clock pulse No. 1 passing through the AND gate 106, it will continue to receive clock pulses No. 2 through No. 91 through the AND gate 126 to ensure that it remains set. While the counter 104 is counting from two to ninety, the clock pulses No. 3 through No. 91 will pass through the AND gate 114, which will be enabled to ensure that the precision switch 21 remains closed. After the flip-flop 110 is reset, the gate 120 will be enabled by a signal from the ZERO output of the flip-flop 110 so that the clock pulses will continue to pass through the gate 120 to ensure that the precision switch 21 remains open until the flip-flop 110 is again set. When the counter 104 produces the ready signal after recycling to zero, the timing logic 19 is again ready to respond to an enabling signal from the positive trigger 15 or from the negative trigger 17. The timing logic 19 responds to the enabling signal from the negative trigger 17 to control the precision switch 23 in exactly the same manner that it controls the precision switch 21 in response to the enabling signal from the positive trigger 15, and is provided with corresponding logic circuitry to carry out this function comprising the AND gate 102 corresponding to the AND gate 100, an AND gate 128 corresponding to the AND gate 106, a flip-flop corresponding to the flip-flop 110, AND gates corresponding to AND gates 112, 114, and 124, an OR gate 138 corresponding to the OR gate 122, and AND gates 140 and 142 corresponding to AND gates 120 and 126. This logic circuitry operating in response to the negative trigger 17 co-operates with the clock pulse generator 108, the OR gate 116, the AND gate 118 and the counter 104 to control the precision switch 23 in the same manner that the precision switch 21 is controlled by the corresponding logic circuitry operating in response to the positive trigger 15. The positive potential from the ONE output of the flip-flop 110 passing through the enabled AND gate 112 is applied to an output counter, not shown, over the channel 24 and constitutes an output pulse from the timing logic 19 indicating a positive increment of the integral. A corresponding positive output potential from the ONE output of the flip-flop 130 passing through the enabled AND gate 132 is applied over channel 26 to the counter and constitutes a pulse representing a negative increment of the integral.

Figure 6:
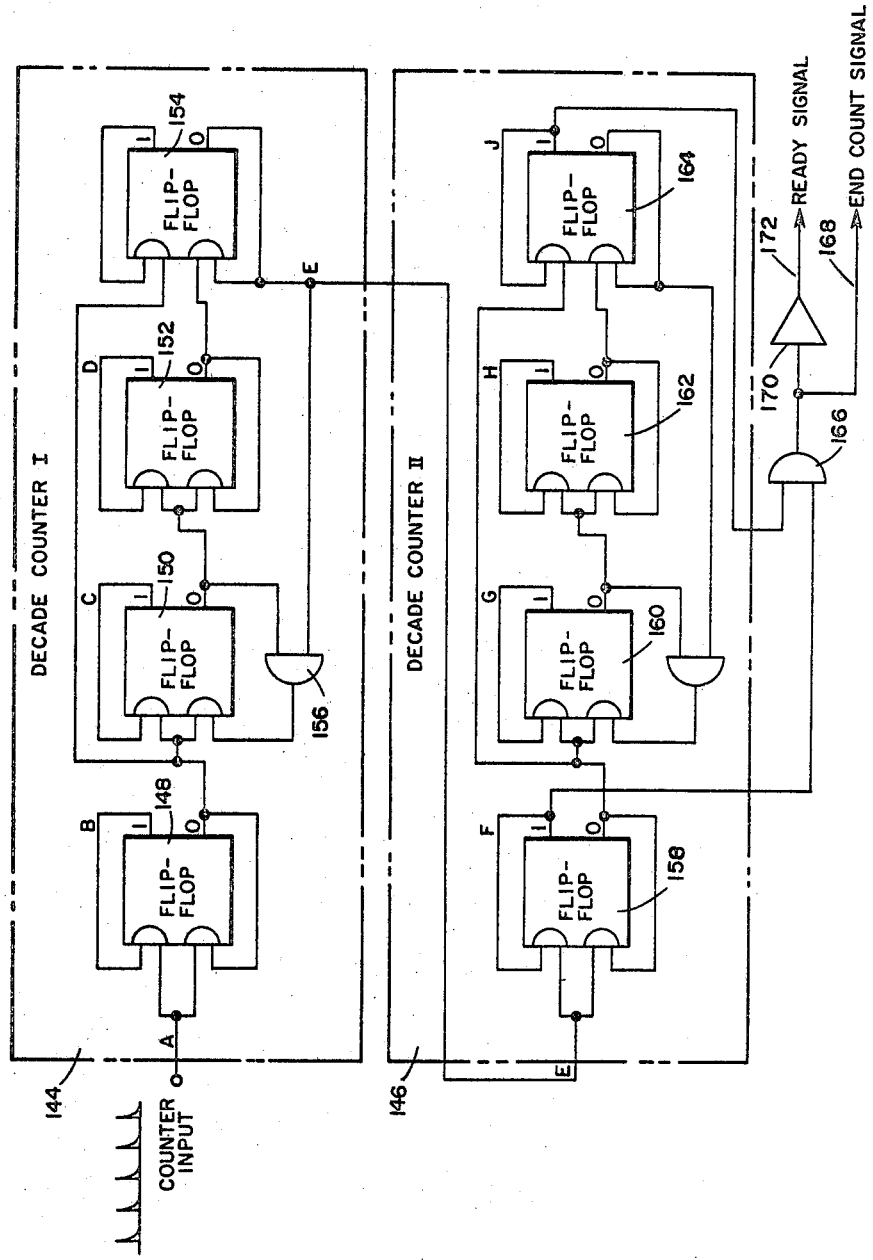
FIG. 6 illustrates in detail the counter component of the timing logic circuit shown in FIG. 4.

FIG. 6 is a block diagram illustrating the details of the binary counter 104. As shown in FIG. 6, the binary counter 104 comprises two decade counters 144 and 146. The decade counter 144 comprises four flip-flops 148, 150, 152, and 154. The flip-flop 148 receives the applied pulses from the clock pulse generator and switches to its opposite state in response to each applied pulse. Each time the flip-flop 148 switches to its ZERO state it applies a pulse to the flip-flop 150. The flip-flop 148 will thus produce output pulses at half the frequency of the applied clock pulses. The flip-flop 150 will be switched back to its ZERO state each time it is in its ONE state and a pulse applied thereto from the flip-flop 148 and will be switched to its ONE state each time it is in its ZERO state and a pulse is applied from the flip-flop 148 if the flip-flop 154 is also in its ZERO state. An AND gate 156 enabled only when the flip-flop 154 is in its ZERO state is used in the circuit of the flip-flop 150 to prevent the flip-flop 150 from being switched to its ZERO state when the flip-flop 154 is in its ONE state. The output pulses from the flip-flop 148 are also applied to the flip-flop 154 and will switch the flip-flop 154 to its ZERO state if it is in its ONE state. Each time the flip-flop 150 switches to its ZERO state, it will apply a pulse to the flip-flop 152 which, in response to each pulse applied from the flip-flop 150, will switch to the opposite state. Each time the flip-flop 152 switches to its ZERO state, it will apply a pulse to the flip-flop 154 to set the flip-flop 154 in its ONE state. When the flip-flop 154 is reset back to its ZERO state by the next output pulse from the flip-flop 148, the decade counter 144 produces an output pulse which is applied to the decade counter 146. With this arrangement the decade counter 144 will produce an output pulse for every ten input pulses applied to the input of the decade counter 144. When the first pulse is applied to the decade counter 144, all of the flip-flops 148 through 154 will be in their ZERO states. The decade counter 144 will then count as a true binary counter up through the seventh pulse applied to the input of the decade counter 144. At this point the flip-flops 148, 150, and 152 will be in their ONE states and the flip-flop 154 will be in its ZERO state. The next pulse applied to the input of the counter 144 will cause all of the flip-flops 148, 150, and 152 to switch to their ZERO states and the output pulse from the flip-flop 152 will switch the flip-flop 154 to its ONE state. The ninth pulse applied to the counter 144 will switch the flip-flop 148 to its ONE state. The tenth pulse applied to the input of the counter 144 will switch the flip-flop 148 back to its ZERO state and the output pulse produced from the flip-flop 148 will be applied to the flip-flop 154 to switch the flip-flop 154 to its ZERO state. Upon switching to its ZERO state, the flip-flop 154 produces the output pulse of the decade counter 144 applied to the input of the decade counter 146. When the flip-flop 148 switches to its ZERO state on the application of the tenth pulse to the counter 144, the resulting pulse applied to the flip-flop 150 will not switch this flip-flop to its ONE state since the flip-flop 154 will not yet be in its ZERO state. Therefore, after the tenth pulse is applied to the counter 144, all of the flip-flops 148 through 154 will be in their ZERO states. Hence the counter 144 recycles upon every ten applied input pulses.

Counter 146 comprises four flip-flops 158, 160, 162, and 164 and is identical to the counter 144. Counter 146 therefore also recycles upon every ten applied input pulses. The counters 144 and 146 together therefore recycle to zero every 100 pulses applied to the input of the counter 144. When the flip-flop 158 and the flip-flop 164 are in their ONE states, they both apply enabling signals to an AND gate 166 which in response thereto produces a positive enabling signal on an output 168. The output from the AND gate 166 is also applied to an inverter 170 which produces a positive enabling signal on an output 172 whenever the gate 166 is not producing a positive enabling output signal. The end count signal is produced from the output 168 and the ready signal is produced from the output 172. The flip-flops 158 and 164 will both be in their ONE states only when the count registered by the counter 146 is nine. Thus the AND gate 166 will produce a positive enabling signal on output 168 when the ninth pulse is applied to the input of the counter 146 or when the ninetieth pulse is applied to the input of the counter 144. Since the counter 146 will register nine until it receives the next output pulse from the counter 144, the AND gate 166 will continue to produce a positive enabling signal on output 168 until the one-hundredth pulse is applied to the input of the counter 144 recycling both counters 144 and 146 to zero. Thus a positive enabling signal is produced on output line 168 from the ninetieth to the one hundredth pulse applied to the counter 144 and at all other times a positive enabling signal is produced at output 172.

Figure 2:
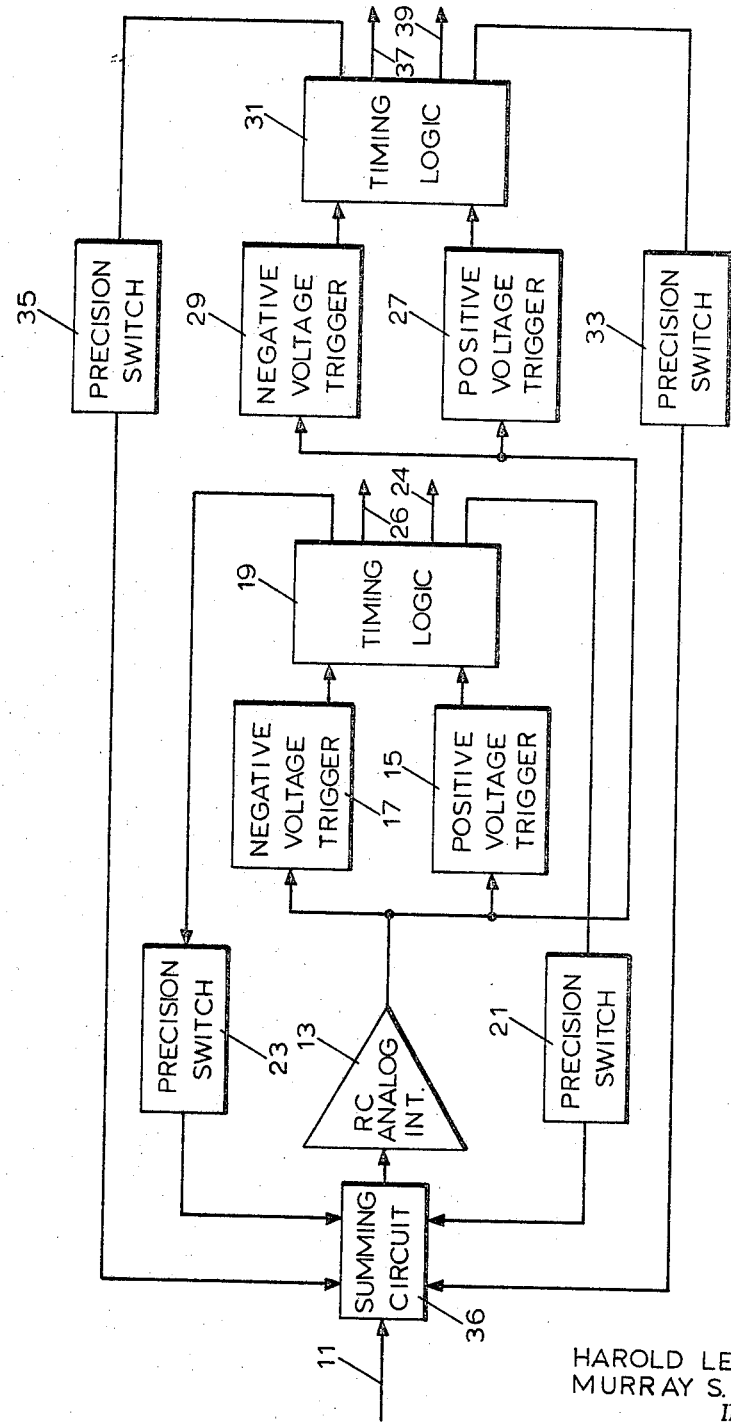
FIG. 2 illustrates the dual speed reset integrator incorporated in the present invention.

The dual speed reset integrator is illustrated in FIG. 2. As shown in FIG. 2, part of this integrator is identical to the reset integrator shown in FIG. 1 and operates in exactly the same manner. It comprises the analog integrator 13 and the positive and negative voltage triggers 15 and 17, the timing logic 19 and the precision switches 23 and 21. The output from the analog integrator 13, in addition to being fed to the positive and negative voltage triggers 15 and 17, is fed to two additional positive and negative voltage triggers 27 and 29. The positive and negative voltage triggers 27 and 29 differ from the positive and negative voltage triggers 15 and 17 in that the trigger magnitude for the triggers 27 and 29 is ten times that of the triggers 15 and 17. The trigger magnitude for the positive and negative voltage triggers 15 and 17 is an output voltage of the integrator 13 representing a velocity of 0.1 knot. The trigger magnitude for the positive and negative triggers 27 and 29 is an output voltage of the integrator 13 representing a velocity of 1.0 knot. The positive and negative voltage triggers 27 and 29 apply signals to a timing logic circuit 31, which responds to these signals to control a pair of precision switches 33 and 35 in the same manner that the timing logic circuit 19 responds to the signals from the positive and negative voltage triggers 15 and 17 to control the precision switches 21 and 23. The precision switches 33 and 35 are identical to the precision switches 21 and 23 and accordingly the precision switch 33 will produce an output pulse having a precise impulse content whenever the output signal voltage of the integrator 13 reaches a value representing plus one knot, and the precision switch 35 will produce an output pulse having a precise impulse content whenever the output signal of the integrator 13 reaches a value representing minus one knot. Since the precision switches 33 and 35 are identical to the precision switches 21 and 23, respectively, and since the timing logic circuit 31 is identical to the timing logic circuit 19, the impulse content of the output pulses produced by the precision swicthes 33 and 35 will be the same as that produced by the precision switches 21 and 23. The output pulses from the precision switches 21, 23, 33 and 35 are applied to a summing circuit 36 in which the output pulses from the precision switches 33 and 35 are summed through resistances one-tenth as large as the resistances through which the output pulses from the precision switches 21 and 23 are summed, so that the output pulses of the precision switches 21 and 23 are attenuated ten times as much as the output pulses from the precision switches 33 and 35. As a result, an output pulse from the precision switch 33 will cause the output voltage of the integrator 13 to change in a negative direction by an amount ten times as great as that caused by an output pulse from the precision switch 21 and an output pulse from the precision switch 35 will cause the output voltage of the analog integrator 13 to change in the positive direction by an amount ten times that caused by an output pulse of the precision switch 23. Thus an output pulse from the precision switch 33 or the precision switch 35 will change the output voltage of the analog integrator 13 by an amount substantially equal to the trigger magnitude of the positive and negative voltage triggers 27 and 29.

When the acceleration signal applied to the input of the integrator 13 is a relatively small acceleration, the precision switches 21 and 23 will operate to continuously reset the output voltage of the integrator 13 back near zero and the precision switches 33 and 35 will not operate. However, when a signal representing a large acceleration is applied to the input 11, the precision switches 21 and 23 will not operate fast enough and the output voltage of the integrator 13 will rise to the trigger magnitude of the positive and negative voltage triggers 27 and 29. As a result, one of the precision switches 33 and 35 will apply a pulse to the integrator 13 to reset its output voltage back near zero. Each time the timing logic 31 causes the precision switch 35 to apply a reset pulse to the analog integrator 13, it also produces a pulse on an output channel 37, and each time the timing logic 31 causes the precision switch 33 to apply a pulse to the integrator 13, it will produce a pulse on an output channel 39. The integral of the signal applied to the input 11 representing acceleration or in other words the velocity, can be determined by counting the pulses produced on outputs 37 and 39 as well as on output channels 24 and 26. Ten times the number of pulses produced on output channel 39 plus the number of output pulses produced on output channel 24 minus ten times the number of pulses produced on output channel 37 minus the number of pulses produced on output channel 26 will represent the integral of the signal applied to input 11 or in other words will represent the velocity. The output pulses from the timing logic 31 on channels 37 and 39 are referred to as the coarse output of the dual speed integrator and the output pulses of the timing logic 19 on output channels 24 and 26 are referred to as the fine output of the dual speed reset integrator.

Figure 3:
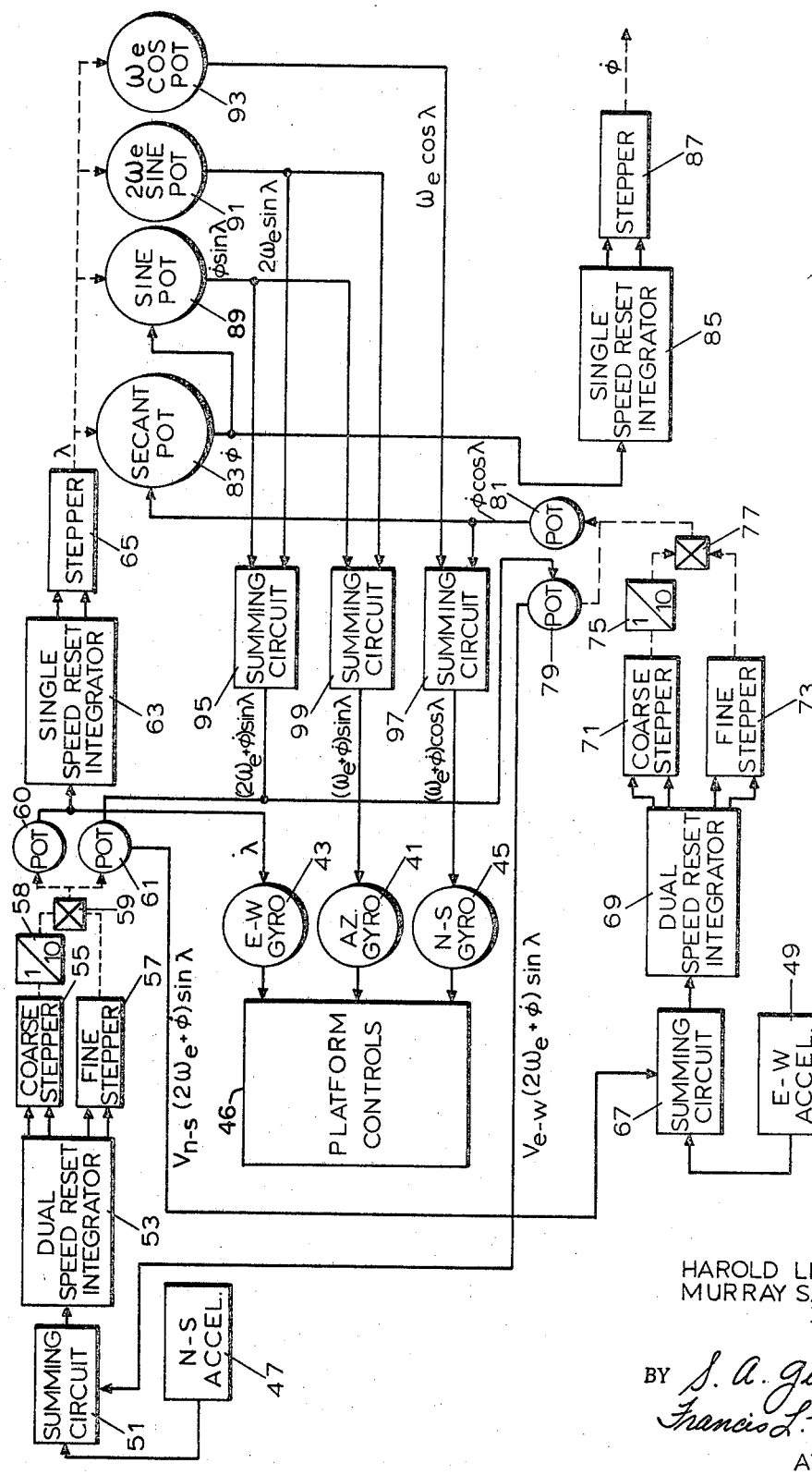
FIG. 3 illustrates the inertial navigation system of the present invention.

In the navigation system as illustrated in FIG. 3, three gyros 41, 43 and 45 are mounted on a platform (not shown). The gyro 41 is referred to as the azimuth gyro and signals from this gyro detect rotation of the platform about the vertical axis of the platform. The gyros 43 and 45 are referred to as the east-west and north-south gyros, respectively. The east-west gyro 43 detects rotation of the platform about the east-west axis and the north-south gyro 45 detects rotation of the platform about the north-south axis. The output signals of the gyros 41, 43 and 45 are fed to platform controls 46, which in response to these signals maintain the vertical axis of the platform aligned with true vertical and the north-south axis of the platform aligned with true north. A north-south accelerometer 47 is mounted on the platform to sense acceleration of the platform along the north-south axis of the platform. An east-west accelerometer 49 is mounted on the platform to sense acceleration of the platform along the east-west axis of the platform.

The output signal of the accelerometer 47 is applied to a summing circuit 51, where a correction signal is added to it, and then applied to the input of a dual speed reset integrator 53, which is an integrator as disclosed in FIG. 2. The coarse output of the dual speed reset integrator 53 is applied to a coarse stepper 55 and the fine output of the integrator 53 is applied to a fine stepper 57. The stepper 55 comprises a stepper motor together with appropriate logic circuitry to step in one direction in response to a pulse on one output channel of the coarse output of the integrator 53 and to step in the opposite direction in response to a pulse on the other output channel of the coarse output of the integrator 53. Similarly, the fine stepper 57 comprises a stepper motor with appropriate logic circuitry to step in one direction in response to an output pulse on one channel of the fine output of the integrator 53 and to step in the opposite direction in response to a pulse on the other output channel of the fine output of the integrator 53. The output of the coarse stepper 55 drives a gear train 58 which rotates its output shaft through ten times the angle through which its input shaft rotates. The output of the gear train 58 and the output of the fine stepper 57 are applied to a differential 59 where these two outputs are mechanically added together to provide a single output representing the velocity in a north-south direction. This output in the form of a shaft rotation drives two potentiometers 60 and 61. Potentiometer 60 has a constant DC voltage applied across it and produces an output signal representing velocity in the north-south direction, or in other words the rate of change of latitude represented by the symbol $\dot{\lambda}$, $\lambda$ being used to represent latitude. The output signal of the potentiometer 60 is used to torque the east-west gyro 43 and in this manner keeps the platform unpivoted about the east-west axis as the aircraft changes latitude.

The output signal of the potentiometer 60 representing $\dot{\lambda}$ is integrated by a single speed reset integrator 63 such as that shown in FIG. 1. The output pulses of the integrator 63 are fed to a stepper 65 which comprises a stepper motor and appropriate logic circuitry to step in one direction in response to pulses on one output channel of the integrator 63 and to step in the opposite direction in response to pulses in the other output channel of the integrator 63. The angular position of the output shaft of the stepper 65 will accordingly represent the integral of the signal applied to the input of the integrator 63 and therefore will represent the latitude $\lambda$.

The output signal of the accelerometer 49 is applied to a summing circuit 67, where it has a correction signal added thereto, and then is applied to the input of a dual speed reset integrator 69 which is an integrator of the type illustrated in FIG. 2. The coarse output of the integrator 69 is applied to a coarse stepper 71 and the fine output of the integrator 69 is fed to a fine stepper 73. The coarse stepper 71 and the fine stepper 73 are like the coarse and fine steppers 55 and 57 and convert the coarse and fine outputs of the dual speed reset integrator 69 into shaft rotations. The shaft output of the coarse stepper 71 drives the input of a gear train 75, which multiplies the output shaft angle of the stepper by 10. The output of the gear train 75 and the output of the fine stepper 73 are mechanically added together by a differential 77 to produce a signal representing the integral of the signal applied to the input of the integrator 69. Accordingly, the angular position of the output shaft of the differential 77 will represent velocity in the east-west direction. The output shaft of the differential 77 is connected to drive the movable contacts of two potentiometers 79 and 81. The potentiometer 81 has a DC constant voltage applied across its resistance so the output signal of the potentiometer 81 will be proportional to the velocity in the east-west direction. The velocity in the east-west direction will be proportional to the quantity $$\dot{\phi} \cos \lambda$$

in which $\phi$ is the rate of change of longitude $\phi$. Accordingly, the output signal of the potentiometer 81 can be used to present the quantity $$\dot{\phi} \cos \lambda$$

The output signal of the potentiometer 81 is fed to a secant potentiometer 83, the movable contact of which is coupled to the shaft output of the stepper 65. The secant potentiometer 83 multiplies the output signal of the potentiometer 81 times the secand of $\lambda$ and as a result produces an output signal representing $\dot{\phi}$. This signal is applied to the input of a single speed reset integrator 85 of the type illustrated in FIG. 1. The pulse output of the integrator 85 is fed to a stepper 87 which is like the stepper 65 and converts the pulse output of the integrator 85 to an angular shaft position representing the integral of the signal applied to the input of the integrator 85. Accordingly the angular position of the output shaft of the stepper 87 will represent the longitude $\phi$.

The output shaft of the stepper 65 representing the latitude $\lambda$ also drives the movable contacts of a pair of sine potentiometers 89 and 91 and a cosine potentiometer 93.

The output signal of the secant potentiometer 83 is applied across the resistance of the sine potentiometer 89 so that the potentiometer 89 produces an output signal representing $\dot{\phi} \sin \lambda$. The sine potentiometer 91 has a DC signal voltage applied across it representing the quantity 2 $\omega_e$ so that it produces an output signal representing 2 $\omega_e \sin \lambda$. The output signals of the potentiometers 89 and 91 are added together by a summing circuit 95, which produces an output signal representing the quantity (2 $\omega_e + \dot{\phi}$) sin $\lambda$. The output signal of the summing circuit 95 is applied across the resistances of the potentiometers 61 and 79. Since the movable contact of the potentiometer 61 is coupled to the output shaft of the differential 59, the position of which represents velocity in the north-south direction, the potentiometer 61 will produce an output signal representing the quantity $V_{hs}$ (2$\omega_e + \dot{\phi}$) sin $\lambda$, in which $V_{ns}$ is the velocity in the north-south direction. This output signal of the potentiometer 61 is applied to the summing circuit 67 and constitutes the correction signal added to the output signal of the accelerometer 59 prior to the integration by the integrator 69. Since the potentiometer 79 has its movable contact driven by the output shaft of the differential 77, the angular position of which represents velocity in the east-west direction, the potentiometer 79 will produce an output signal representing the quantity $V_{ew}(2\omega_e + \dot{\phi})$ sin $\lambda$ in which $V_{ew}$ represents velocity in the east-west direction. This output signal of the potentiometer 79 is applied to the summing circuit 51 and constitutes the correction signal added to the output signal of the accelerometer 47 prior to its integration by the reset integrator 53.

The output signal of the potentiometer 81 representing $\dot{\phi} \cos \lambda$ and the output signal of the potentiometer 93 representing $\omega_e \cos \lambda$ are applied to a summing circuit 97 where these two signals are added together to produce an output signal representing the quantity $(\omega_e + \dot{\phi}) \cos \lambda$. This signal is used to torque the north-south gyro 45 so as to maintain the platform unpivoted about the north-south axis as the aircraft carrying this platform moves in the east-west direction. The output signal of the potentiometer 89 representing $\dot{\phi}$ sin $\lambda$ and the output signal of the potentiometer 91 representing 2$\omega_e$ sin $\lambda$ are applied to a summing circuit 99, which adds the output signal of the potentiometer 89 to one half the output signal of the potentiometer 91. As a result the summing circuit 99 produces an output signal representing the quantity $(\omega_e + \dot{\phi})$ sin $\lambda$. This signal is used to torque the azimuth gyro 41 to maintain the north-south axis of the platform aligned with true north as the aircraft moves in the east-west direction.

Thus there is provided a precise analog inertial navigation system making use of digital reset integrators to provide the necessary integration. Because the reset integrators are used to provide the necessary integration, much greater accuracy is obtained than was heretofore possible with conventional analog integrators. Instead of using the dual speed reset integrator shown in FIGURE 2 for the first integrators, the system could use the dual speed reset integrator disclosed in the above-mentioned copending application Ser. No. 279,422. This and many other modifications may be made to the above described specific embodiment of the invention without departing from the spirit and scope of the invention, which is defined in the appended claims.

What is claimed is:

1. An analog inertial navigation system comprising a stable platform having first and second mutually perpendicular horizontal axes, means to maintain said axes in alignment with a coordinate system, a first accelerometer means secured to said platform for producing an analog signal representing acceleration of said platform along said first horizontal axis, a first analog integrator connected to integrate the output signal of said first accelerometer means, first reset means responsive to the output signal of said first analog integrator reaching a predetermined magnitude to apply to the input of said first analog integrator a reset pulse of precisely predetermined impulse content and having a polarity to change the output signal of said first analog integrator back towards zero, first conversion means to generate an analog signal varying in accordance with the member of reset pulses of one polarity produced by said first reset means minus the number of reset pulses of the opposite polarity produced by said first reset means, a second analog integrator connected to integrate the output signal of said first conversion means, second reset means responsive to the output signal of said second analog integrator reaching a predetermined magnitude to apply to the input of said second analog integrator a reset pulse of precisely predetermined impulse content and having a polarity to change the output signal of said second analog integrator back toward zero, second accelerometer means secured to said platform for producing a signal representing the acceleration of said platform along said second horizontal axis, a third analog integrator connected to integrate the output signal of said second accelerometer means, third reset means responsive to the output signal of said third analog integrator reaching a predetermined magnitude to apply to the input of said third analog integrator a reset pulse of precisely predetermined impulse content and having a polarity to change the output signal of said third analog integrator back toward zero, second conversion means to produce an analog signal varying in accordance with the number of reset pulses of one polarity produced by said third reset means minus the number of reset pulses of the opposite polarity produced by said third reset means, a fourth analog integrator connected to integrate the output signal of said second conversion means, and fourth reset means responsive to the output signal of said fourth analog integrator reaching a predetermined magnitude to apply to the input of said fourth analog integrator a reset pulse of precisely predetermined impulse content and having a polarity to change the output signal of said fourth analog integrator back toward zero.

2. An inertial navigation system comprising a stable platform, means to maintain said platform in alignment with a coordinate system, accelerometer means secured to said platform for producing a signal representing acceleration of said platform along an axis of said platform, a first analog integrator connected to integrate the output signal of said accelerometer means, first reset means responsive to the output signal of said first analog integrator reaching a predetermined magnitude to apply to the input of said first analog integrator a reset pulse of precisely predetermined impulse content and having a polarity to change the output signal of said first analog integrator back toward zero, conversion means to produce an analog output signal varying in accordance with the number of reset pulses of one polarity produced by said first reset means minus the number of reset pulses of the opposite polarity produced by said first reset means, a second analog integrator connected to integrate the output signal of said conversion means, and a second reset means responsive to the output signal of said second analog integrator reaching a predetermined magnitude to apply to the input of said second analog integrator a reset pulse of precisely predetermined impulse content and having a polarity to change the output signal of said second analog integrator back toward zero.

3. An inertial navigation system comprising a stable platform, means to maintain said platform in alignment with a coordinate system, an accelerometer means secured to said platform for producing an analog signal representing acceleration of said platform along an axis thereof, a first analog integrator connected to integrate the output signal of said accelerometer means, first reset means responsive to the output signal of said first analog integrator reaching a first predetermined magnitude to apply to the input of said first analog integrator a reset pulse of precisely predetermined impulse content and having a polarity to change the output signal of said first analog integrator back towards zero, second reset means responsive to the output signal of said analog integrator reaching a second predetermined magnitude greater than said first predetermined magnitude to apply to the input of said first analog integrator a reset pulse of precisely predetermined impulse content and having a polarity to change the output signal of said analog integrator back towards zero, a reset pulse produced by said second reset means changing the output signal voltage of said first analog integrator by a greater amount than a reset pulse produced by said first reset means, conversion means to produce an analog signal varying in accordance with the number of reset pulses of one polarity produced by said first reset means minus the number of reset pulses of the opposite polarity produced by said first reset means and in accordance with the number of reset pulses of one polarity produced by said second reset means minus the number of reset pulses of the opposite polarity produced by said second reset means, a second analog integrator connected to integrate the output signal of said conversion means, and third reset means responsive to the output signal of said second analog integrator reaching a predetermined magnitude to apply to the input of said second analog integrator a reset pulse of precisely predetermined impulse content and having a polarity to change the output signal of said second analog integrator back towards zero.

4. An inertial navigation system comprising a stable platform means to maintain said platform in alignment with a coordinate system, accelerometer means secured to said platform for producing a signal representing acceleration of said platform along an axis thereof, a first analog integrator connected to integrate the output signal of said first accelerometer means, first reset means responsive to the output signal of said first analog integrator reaching a first predetermined magnitude to apply to the input of said first analog integrator a reset pulse of precisely predetermined impulse content and having a polarity to change the output signal of said first analog integrator back towards zero, second reset means responsive to the output signal of said first analog integrator reaching a second predetermined magnitude greater than said first predetermined magnitude to apply to the input of said first analog integrator a reset pulse of precisely predetermined impulse content and having a polarity to change the output signal of said first analog integrator back towards zero, the reset pulses produced by said first reset means changing the output voltage of said first analog integrator a predetermined fraction of the change in voltage caused by the reset pulses produced by said second reset means, conversion means for producing an analog output signal varying in accordance with said predetermined fraction of the number of reset pulses of one polarity produced by said first reset means minus said predetermined fraction of the number of reset pulses of the opposite polarity produced by said first reset means plus the number of reset pulses of said one polarity produced by said second reset means minus the number of reset pulses of said opposite polarity produced by said second reset means, a second analog integrator connected to integrate the output signal of said conversion means, and third reset means responsive to the output signal of said second analog integrator reaching a predetermined magnitude to apply to the input of said second analog integrator a reset pulse of precisely predetermined impulse content and having a polarity to change the output signal of said second analog integrator back towards zero.

5. An inertial navigation system comprising a stable platform, means to maintain said platform in alignment with a coordinate system, accelerometer means secured to said platform for producing an output signal representing the acceleration of said platform along an axis thereof, a first analog integrator connected to integrate the output signal of said accelerometer means, first reset means responsive to the output signal of said first analog integrator reaching a first predetermined magnitude to apply to the input of said first analog integrator a reset pulse of precisely predetermined impulse content and having a polarity to change the output signal of said first analog integrator back towards zero, second reset means responsive to the output signal of said first analog integrator reaching a second predetermined magnitude greater than said first predetermined magnitude to apply to the input of said first analog integrator a reset pulse of precisely predetermined impulse content and having a polarity to change the output signal of said first analog integartor back towards zero, the reset pulses produced by said first reset means changing the output voltage of said analog integrator a predetermined fraction of the change in voltage caused by the reset pulses produced by said second reset means, a first stepper motor, means to cause said first stepper motor to step in one direction each time said first reset means produces a reset pulse of one polarity and to cause said first stepper motor to step in the opposite direction each time said first means produces a pulse of the opposite polarity, a second stepper motor, means to cause said second stepper motor to step in one direction each time said second reset means produces a reset pulse of one polarity and to cause said second stepper motor to step in the opposite direction each time said second reset means produces a reset pulse of the opposite polarity, speed change means having an input shaft coupled to the output shaft of one of said stepper motors and positioning an output shaft at an angular position having a predetermined ratio to the angular position of its input shaft, differential means having a first input shaft coupled to the output shaft of the other one of said stepper motors and a second input shaft coupled to the output shaft of said speed change means and positioning an output shaft at an angular position equal to the sum of the angular positions of its input shafts, conversion means to convert the angular position of the output shaft of said differential means to an analog electrical signal, a second analog integrator connected to integrate the output signal of said conversion means, and third reset means responsive to the output signal of said second analog integrator reaching a predetermined magnitude to apply to the input of said second analog integrator a reset pulse of precisely predetermined impulse content and having a polarity to change the output signal of said second analog integrator back towards zero.

6. An inertial navigation system comprising a stable platform having first and second perpendicular horizontal axes, first accelerometer means secured to said platform for producing a signal representing acceleration of said platform along said first horizontal axis, a first analog integrator connected to integrate the output signal of said first accelerometer means, first reset means responsive to the output signal of said first analog integrator reaching a predetermined magnitude to apply to the input of said first analog integrator a reset pulse of precisely predetermined impulse content and having a polarity to change the output signal of said first analog integrator back towards zero, first conversion means for producing an analog output signal varying in accordance with the number of reset pulses of one polarity produced by said reset means minus the number of reset pulses of the opposite polarity produced by said first reset means, a second analog integrator connected to integrate the output signal of said first conversion means, second reset means responsive to the output signal of said second analog integrator reaching a predetermined magnitude to apply to the input of said second analog integrator a reset pulse of precisely predetermined impulse content and having a polarity to change the output signal of said second analog integrator back towards zero, second conversion means for producing an analog output signal varying in accordance with the number of reset pulses of one polarity produced by said second reset means minus the number of reset pulses of the opposite polarity produced by said second reset means, second accelerometer means secured to said platform for producing a signal representing the acceleration of said platform along said second horizontal axis, a third analog integrator connected to integrate the output signal of said second accelerometer means, third reset means responsive to the output signal of said third analog integrator reaching a predetermined magnitude to apply to the input of said third analog integrator a reset pulse of precisely predetermined impulse content and having a polarity to change the output signal of said third analog integrator back towards zero, third conversion means for producing an output signal varying in accordance with the number of reset pulses of one polarity produced by said third reset means minus the number of reset pulses of the opposite polarity produced by said third reset means, and means responsive to the output signals of said first, second, and third conversion means for maintaining said platform aligned with a coordinate system.

7. An inertial navigation system comprising a stable platform having first, second and third mutually perpendicular axes, means to maintain said first axis aligned with the north-south direction, said second axis aligned with the east-west direction and said third axis aligned with vertical, first accelerometer means secured to said platform for producing an output signal representing the acceleration of said platform along said first axis, a first analog integrator connected to integrate the output signal of said first accelerometer means, first reset means responsive to the output signal of said first analog integrator reaching a predetermined magnitude to apply to the input of said first analog integrator a reset pulse of precisely predetermined impulse content and having a polarity to change the output signal of said first analog integrator back towards zero, first conversion means for producing an analog output signal varying in accordance with the number of reset pulses of one polarity produced by said first reset means minus the number of reset pulses of the opposite polarity produced by said first reset means and representing velocity in the north-south direction, a second analog integrator connected to integrate the output signal of said first conversion means, a second reset means responsive to the output signal of said second analog integrator reaching a predetermined magnitude to apply to the input of said second analog integrator a reset pulse of precisely predetermined impulse content and having a polarity to change the output signal of said second analog integrator back towards zero, second conversion means for producing an output signal varying in accordance with the number of reset pulses of one polarity produced by said second reset means minus the number of reset pulses of the opposite polarity produced by said second reset means and representing latitude, second accelerometer means secured to said platform for producing an output signal representing acceleration of said platform along said second axis, a third analog integrator connected to integrate the output signal of said second accelerometer means, third reset means responsive to the output signal of said third analog integrator reaching a predetermined magnitude to apply to the input of said third analog integrator a reset pulse of precisely predetermined impulse content and having a polarity to change the output signal of said third analog integrator back towards zero, third conversion means for producing an analog output signal varying in accordance with the number of reset pulses of one polarity produced by said third reset means minus the number of reset pulses of the opposite polarity produced by said third reset means and representing velocity in the east-west direction, means to multiply the secant of the latitude as represented by the output signal of said second conversion means times the output signal of said third conversion means to thereby produce an output signal representing the rate of change of longitude, a fourth analog integrator connected to integrate said signal representing rate of change of longitude, and fourth reset means responsive to the output signal of said fourth analog integrator reaching a predetermined magnitude to apply to the input of said fourth analog integrator a reset pulse of precisely predetermined impulse content and having a polarity to change the output signal of said fourth analog integrator back towards zero.

References Cited

UNITED STATES PATENTS

| 3,323,103 | 2/1966 | Schneider | 235—150.25 |
| 2,903,185 | 9/1959 | Myers | 235—183 |
| 3,188,455 | 6/1965 | Quick | 235—183 |
| 3,217,318 | 11/1965 | Masel | 340—347 |

MARTIN P. HARTMAN, Primary Examiner

U.S. Cl. X.R.

33—226; 235—150.51; 244—14, 77